United States Patent [19]
Gravel et al.

[11] Patent Number: 5,763,787
[45] Date of Patent: Jun. 9, 1998

[54] CARRIER ASSEMBLY FOR FLUID SENSOR

[75] Inventors: James L. Gravel, Prior Lake; Bruce L. Johnson, Jordan; Mark Romo, Eden Prairie, all of Minn.

[73] Assignee: Rosemont Inc., Eden Prairie, Minn.

[21] Appl. No.: 711,408

[22] Filed: Sep. 5, 1996

[51] Int. Cl.$^6$ .................................................. G01L 9/04
[52] U.S. Cl. .............................. 73/756; 73/720; 137/487.5
[58] Field of Search ..................... 137/487.5; 73/756, 73/721, 720

[56] References Cited

U.S. PATENT DOCUMENTS

| | | | |
|---|---|---|---|
| 3,315,201 | 4/1967 | Werne | 338/2 |
| 3,808,480 | 4/1974 | Johnston | 317/256 |
| 3,811,429 | 5/1974 | Fletcher et al. | 128/2.05 |
| 3,880,009 | 4/1975 | Johnston | 73/398 |
| 3,930,412 | 1/1976 | Mallon et al. | 73/398 |
| 4,084,438 | 4/1978 | Lee et al. | 73/706 |
| 4,168,517 | 9/1979 | Lee | 361/283 |
| 4,168,630 | 9/1979 | Shirouzu et al. | 73/727 |
| 4,222,277 | 9/1980 | Kurtz et al. | 73/721 |
| 4,295,117 | 10/1981 | Lake et al. | 338/4 |
| 4,325,260 | 4/1982 | Takahashi et al. | 73/726 |
| 4,373,397 | 2/1983 | Keller | 73/721 |
| 4,399,707 | 8/1983 | Wamstad | 73/727 |
| 4,481,967 | 11/1984 | Frick | 137/85 |
| 4,503,705 | 3/1985 | Polchanioff | 73/172 |
| 4,655,088 | 4/1987 | Adams | 73/756 |
| 4,656,454 | 4/1987 | Rosenberger | 338/2 |
| 4,665,754 | 5/1987 | Glenn et al. | 73/727 |
| 4,773,269 | 9/1988 | Knecht et al. | 73/706 |
| 4,790,192 | 12/1988 | Knecht et al. | 73/721 |
| 4,800,758 | 1/1989 | Knecht et al. | 73/727 |
| 4,842,685 | 6/1989 | Adams | 156/308.2 |
| 4,879,903 | 11/1989 | Ramsey et al. | 73/431 |
| 4,942,383 | 7/1990 | Lam et al. | 338/42 |
| 4,993,265 | 2/1991 | Koen et al. | 73/706 |
| 5,001,934 | 3/1991 | Tuckey | 73/721 |
| 5,031,462 | 7/1991 | Lam | 73/756 |
| 5,184,107 | 2/1993 | Maurer | 338/42 |
| 5,207,102 | 5/1993 | Takahashi et al. | 73/727 |
| 5,319,980 | 6/1994 | Kremidas | 73/756 X |
| 5,412,994 | 5/1995 | Cook et al. | 73/727 X |

FOREIGN PATENT DOCUMENTS

| | | |
|---|---|---|
| 0 049 955 A1 | 4/1982 | European Pat. Off. . |
| 56-1328 | 1/1981 | Japan . |
| 56-29135 | 3/1981 | Japan . |
| 56-37530 | 4/1981 | Japan . |
| 57-108632 | 7/1982 | Japan . |
| 57-160038 | 10/1982 | Japan . |
| 59-148841 | 8/1984 | Japan . |

OTHER PUBLICATIONS

"Series P609 OEM Pressure Transducers", by Kavlico Corporation.
"Micromechanics, Fiber Optics Provide Low-Cost, High Performance Sensors", M. Babb, *Control Engineering*, Nov. 1985, pp. 54–56.
"MPX Pressure Transducers", by Motorola Inc. 1981.

*Primary Examiner*—George M. Dombroske
*Assistant Examiner*—Joseph L. Felber
*Attorney, Agent, or Firm*—Westman, Champlin & Kelly, P.A.

[57] ABSTRACT

A carrier assembly includes a sensor housing having first and second housing portions and a sensor cavity formed therebetween for carrying a sensor. A carrier assembly couples to the sensor and provides electrical connections which extend from the sensor and between the first and second housing. The sensor couples to a fluid and provides a sensor electrical output.

21 Claims, 10 Drawing Sheets

CARRIER ASSEMBLY FOR FLUID SENSOR

BACKGROUND OF THE INVENTION

The present invention relates to sensors of the type used in the process control industry. More specifically, the invention relates to a carrier assembly for carrying a sensor used in a process control instrument.

Transmitters and actuators (field devices) are used to control industrial processes such as in the chemical manufacturing industry. The transmitter is placed in the field and couples to the process and uses a sensor to measure a process variable such as pressure, flow, temperature, pH, etc., and transmits this information to a controller, for example. Transmission of the process variable is often achieved using industry standard transmission protocols such as through control of a current on a 4–20 mA current loop or through transmission of a digital signal over such a loop.

The controller, which may be located in a control room, generates a control signal based upon process variable. The control signal is transmitted to an actuator, typically located in the field, which responsively adjusts the process. For example, the actuator may be a valve actuator which controls a valve stem based upon a signal received from the controller. One type of actuator is an I/P actuator which couples to a source of pressurized gas and adjusts a pressure (P) applied to a valve in response to the current (I) such as disclosed in U.S. Pat. No. 4,481,967 issued Nov. 13, 1984 to Frick entitled "Control Circuit For Current To Pressure Converter." Such devices use a pressure sensor in a feedback loop.

Transmitters and actuators frequently operate in harsh environments and are exposed to temperature extremes, vibrations and corrosive chemicals. Thus, the field device is required to be of an extremely robust design and capable of withstanding this environment for extended periods of time.

One critical area of field device design is the coupling of the sensor media being sensed. The sensor must provide the desired sensitivity necessary to measure the parameter with a specified accuracy. Yet, the sensor must be mounted in a manner which allows it to operate in the harsh environment without damage or loss in accuracy.

SUMMARY OF THE INVENTION

The present invention is a process control instrument of the type used to control an industrial process which includes a medium coupling having a coupling passageway for carrying medium to be sensed. A sensor housing includes first and second housing portions which form a sensor cavity therebetween. The sensor housing includes a housing passageway extending from the coupling passageway of the medium coupling to the sensor cavity. A sensor is carried in the sensor cavity and is operably coupled to the housing passageway such that a parameter of the medium may be sensed. The sensor includes a sensor electrical contact which provides a sensor output.

DETAILED DESCRIPTION OF THE PREFERRED EMBODIMENTS

Figure 1:
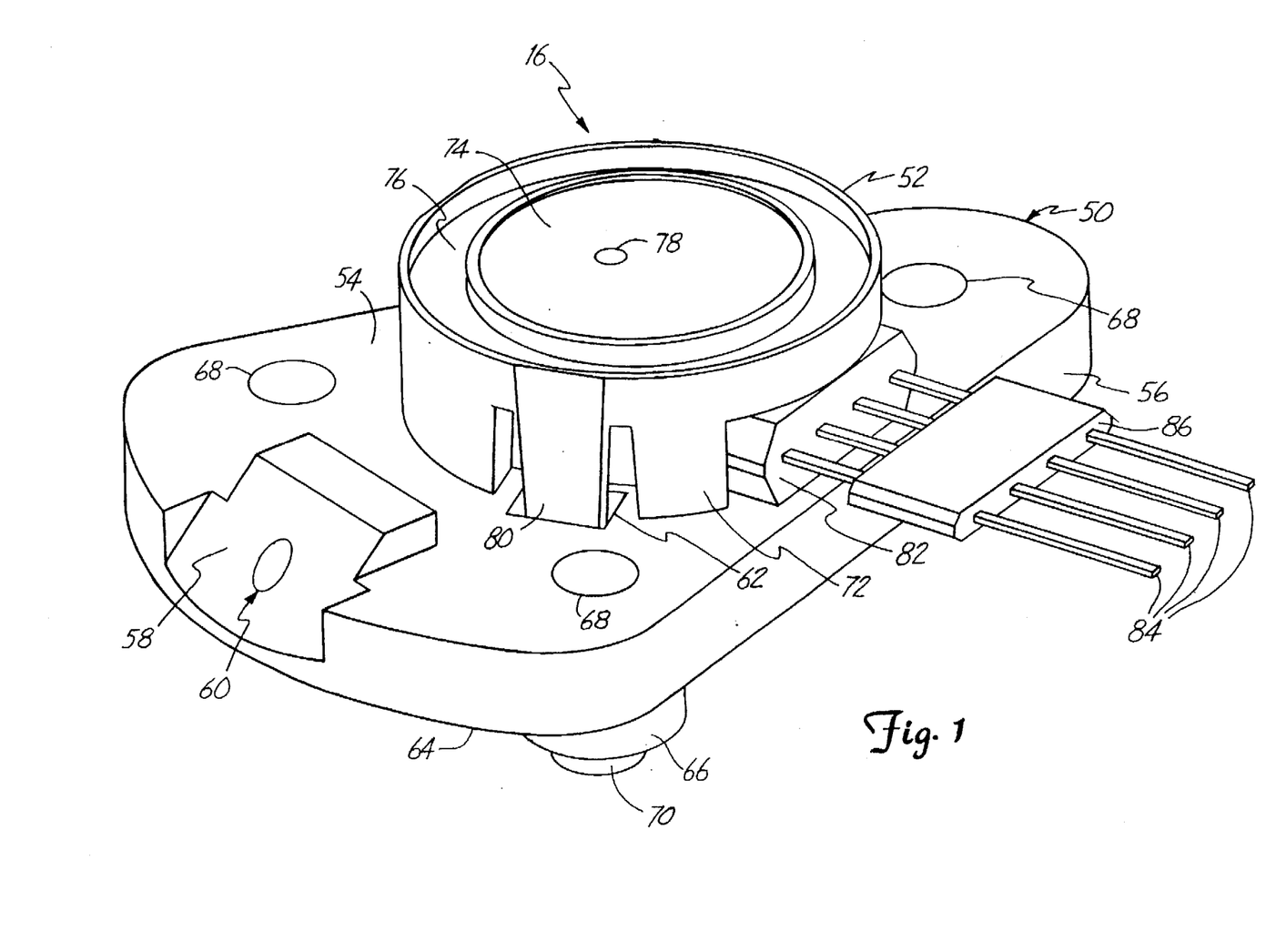
FIG. 1 is a top perspective view of sensor assembly in accordance with the invention.

FIG. 1 is a perspective view of sensor assembly 16 having first housing portion 50 and second housing portion 52 in accordance with the present invention. First housing portion 50 includes sensor coupling face 54 and first sidewall 56. Angled process coupling surface 58 is disposed co-extensively with first sidewall 56 and provides first passageway 60 which extends through first housing portion 50. Tab recesses 62 are formed in first housing portion 50 and extend between sensor coupling face 54 and mounting face 64. Mount 66 is attached to mounting face 64 and includes hole 68 and mounting registration lip 70.

Second housing portion 52 is generally circular and includes second sidewall 72 and upper process coupling surface 74. Upper process coupling surface 74 includes O-ring groove 76 and second passageway 78 which extends through second housing portion 52. Tabs 80 extend from second sidewall 72 and upper process coupling surface 74. First housing portion 50 and second housing portion 52 are attached with tab 80 engaged in tab recess 62. Sensor carrier 82 extends through second sidewall 72 and is disposed between first housing portion 50 and second housing portion 52. Sensor output conductors 84 are coupled to process sensor 98 (not shown in FIG. 1) and extend from sensor carrier 82 and through conductor guide 86 which is spaced apart from sensor carrier 82.

Figure 2:
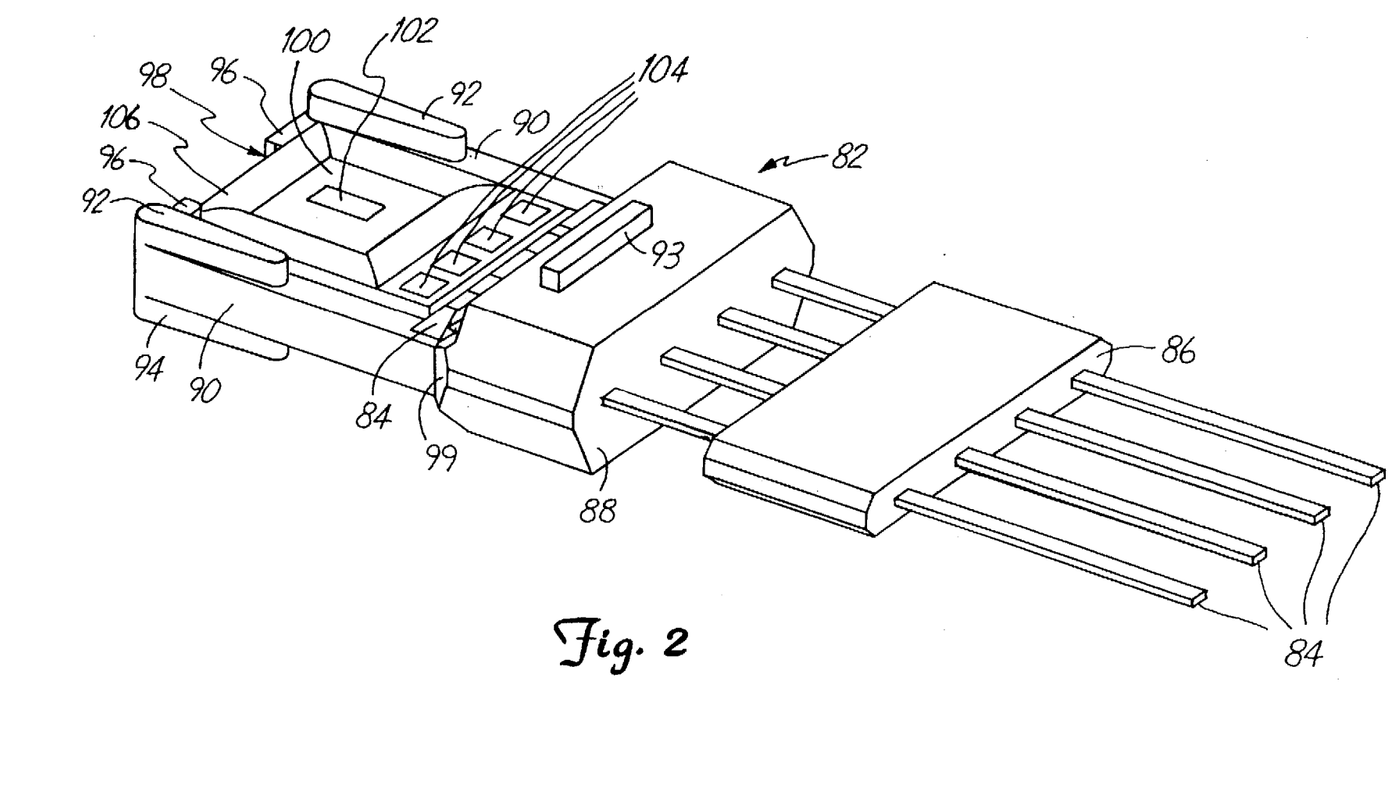
FIG. 2 is a top perspective view of the sensor carrier shown in FIG. 1 holding a process sensor.

Pressure sensor assembly 16 is an improved means of housing pressure sensor 98 (shown in FIG. 2). Sensor assembly 16 snaps together, providing quick and economical assembly. It also protects the electrical contacts from process and isolation fluid (if used), thereby reducing contact degradation. Finally, assembly 16 exposes pressure sensor 98 directly to fluid medium thereby improving pressure and temperature hysteresis, repeatability and pressure relaxation.

Figure 3:
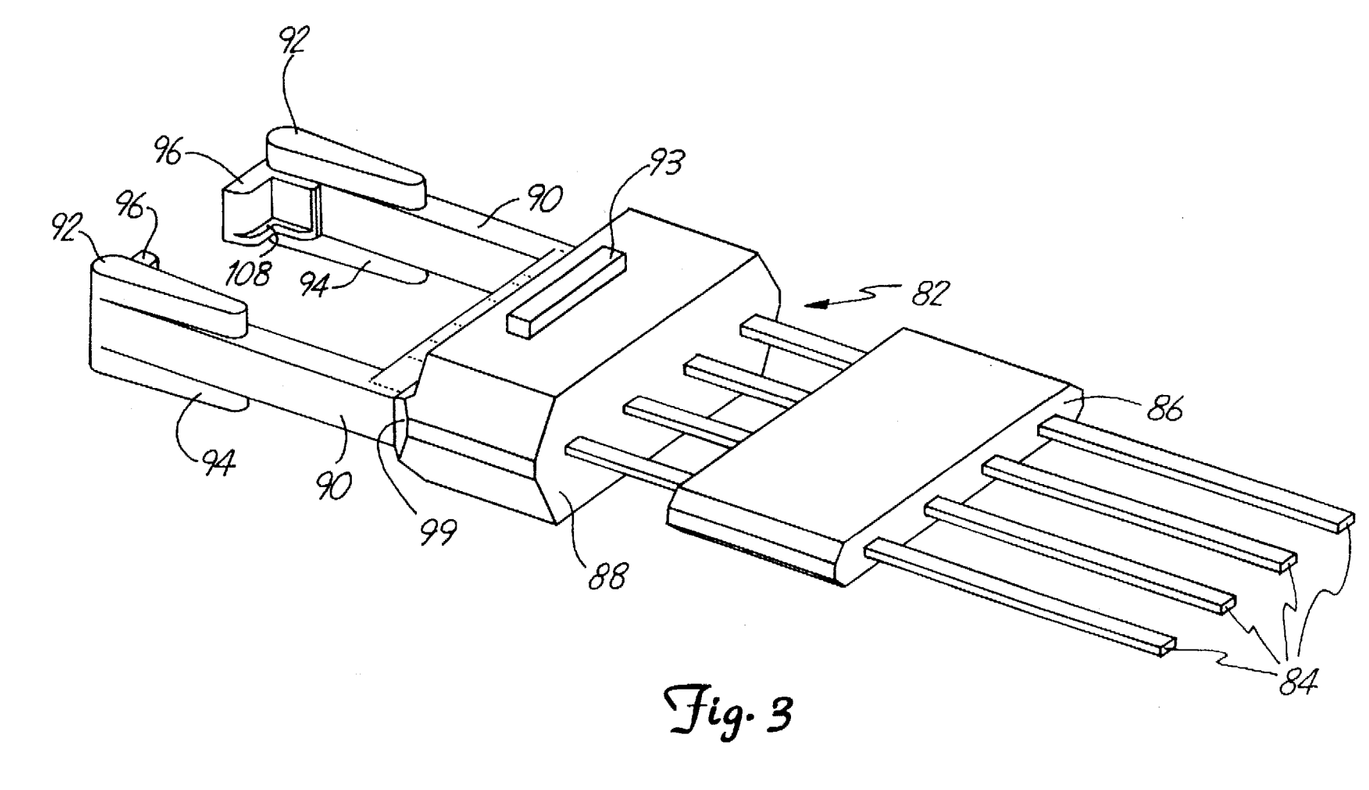
FIG. 3 is a top perspective view of the sensor carrier of FIG. 2.

FIGS. 2 and 3 show top perspective views of sensor carrier 82 and sensor 98. Carrier 82 includes body 88, arms 90, upper placement tab 92 and lower placement tab 94 which may ensure correct registration of sensor 98 during assembly. Body 88 also carries upper tensioning tab 93 and a lower tensioning tab (not shown) which is similar to tab 93. Arms 90 attach to body 88 and extend opposably therefrom. Arms 90 include stops 96 disposed on ends opposite body 88. Arms 90, stops 96 and body 88 cooperate with housing portions 50 and 52 to mount sensor 98 with substantially zero insertion force. Sensor 98 includes first face 100, sensing element 102, and element output pads 104. Element output pads 104 are disposed on first face 100 proximate the edge nearest body 88, and are coupled to sensor output conductors 84. This coupling may be through any appropriate technique such as a wire bond, solder, a pressure contact, elastomeric conductor material (described below in more detail), etc. Sensing element 102 is coupled to element output pads 104. First seal 106, constructed from resilient material such as silicone rubber, is disposed on first face 100 about sensing element 102 without covering element output pads 104. Ledges 108 shown in FIG. 3 are disposed on stops 96, and provide additional support for sensor 98. Further, registration surfaces 99 are used to register carrier 82 during assembly.

Figure 4:
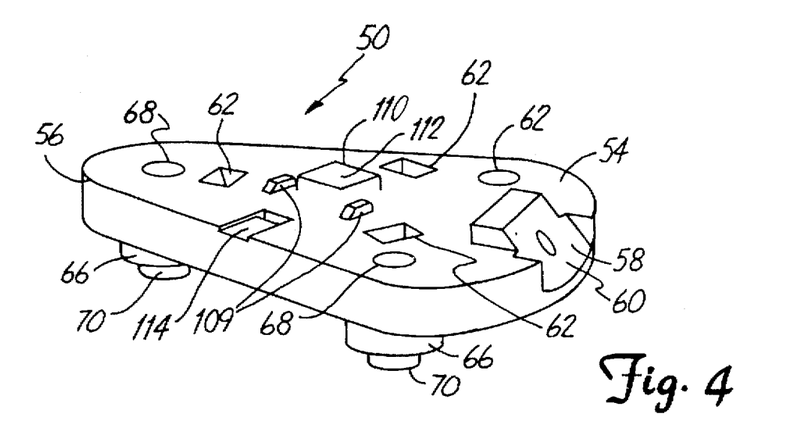
FIG. 4 is a top perspective view of a first housing portion shown in FIG. 1.
Figure 5:
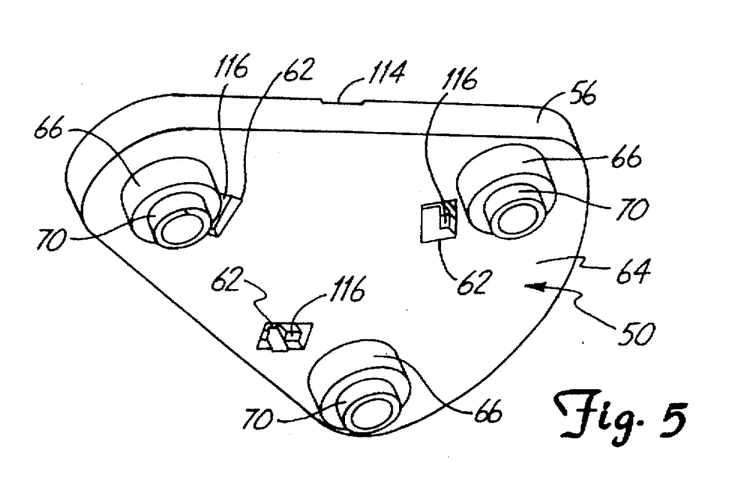
FIG. 5 is a bottom perspective view of a first housing portion.

FIGS. 4 and 5 are top and bottom perspective views, respectively, of first housing portion 50. Sensor carrier registration protrusions 109 are positioned on sensor coupling face 54 and cooperate with opposing surfaces on housing 52 and surface 99 to precisely locate sensor carrier 82 on first housing portion 50. Square-shaped first rim 110 extends from sensor coupling face 54 defining first cavity 112 therein. First passageway 60 communicates with first cavity 112. Tab locks 116 are disposed within tab recesses 62 proximate mounting surface 64 and are adapted to engage tabs 80 in a snap-like manner as tabs 80 pass a fixed distance through tab recesses 62 toward mounting surface 64. Groove 114 is disposed on sensor coupling face 54 co-extensively with first sidewall 56 and conforms to a lower tab (not shown) on carrier 82 shown in FIGS. 2 and 3.

Figure 6:
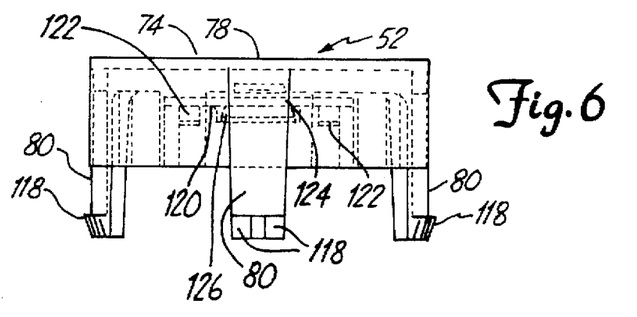
FIG. 6 is an elevation view of a second housing portion shown in phantom.

FIG. 6 is a side elevation view of second housing portion 52 in phantom. Tab catches 118 are disposed on ends of tabs 80. Tab catches 118 engage tab locks 116 to secure second housing portion 52 to first housing port on 50. Second housing portion 52 includes interior face 120 opposed to upper process coupling surface 74. Interior face 120 includes second rim 124 and sensor carrier retainer protrusions 122, which extend from interior face 120. Square-shaped second rim 124 extends from interior face 120 defining second cavity 126 therein. Second passageway 78 communicates with second cavity 126.

Figure 7:
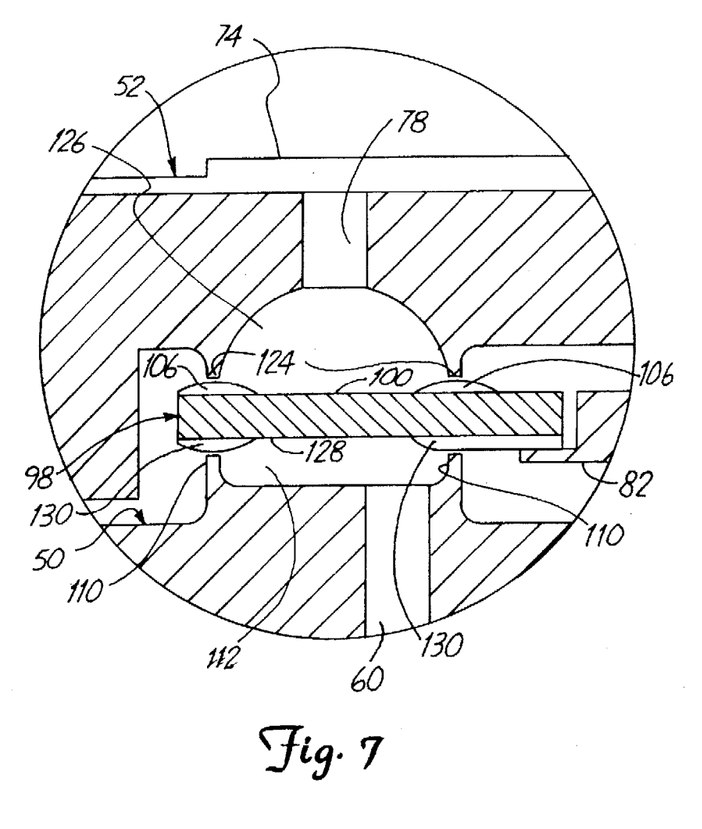
FIG. 7 is a cross-sectional view of a portion of the sensor assembly before completion of assembly.
Figure 8:
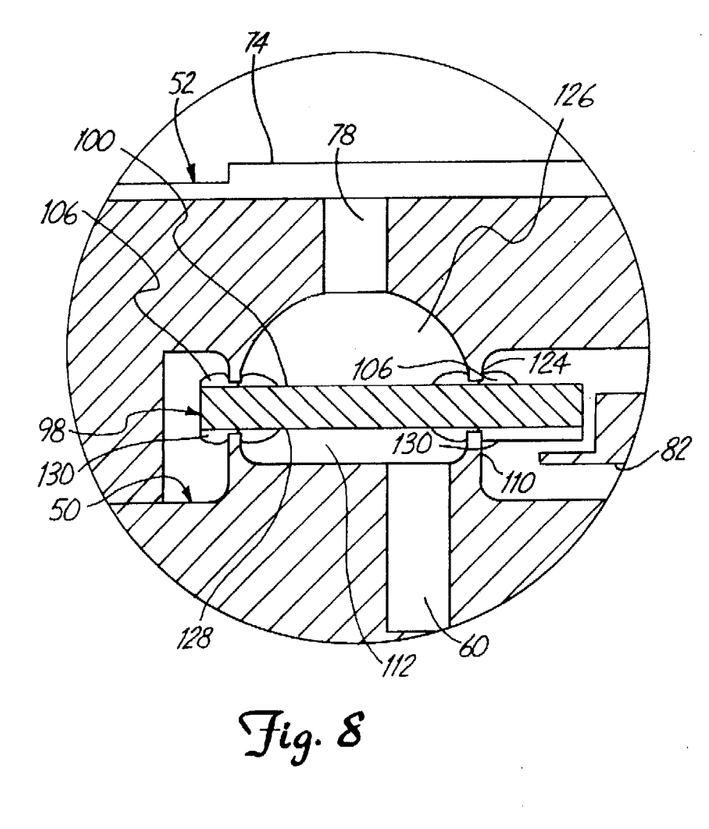
FIG. 8 is a cross-sectional view of a portion of the sensor assembly after completion of assembly.

FIGS. 7 and 8 are sectional elevation views of sensor assembly 16 before and after final assembly, respectively. Sensor 98 includes second face 128 which is opposed to first face 100. Second seal 130, constructed from resilient material, such as silicone rubber, is disposed on second face 128 about sensing element 102 in alignment with first seal 106. Prior to final assembly, both first and second seals are uncompressed as shown in FIG. 7. During final assembly, first housing portion 50 and second housing portion 52 are forced toward each other such that first rim 110 compresses second seal 130 while second rim 124 compresses first seal 106. As a result of precise alignment between first housing portion 50, second housing portion 52 and sensor 98, the force imposed upon sensor 98 by first rim 110 is substantially opposed by the force imposed upon sensor 98 by second rim 124. Therefore, substantially zero moment is imparted to sensor 98. After final assembly, first passageway 60 is in sealed communication with second face 128 and second passageway 78 is in sealed communication with first face 100. Further, as shown in FIGS. 7 and 8, following assembly sensor 98 may be completely supported by seals 106 and 130 so that sensor 98 is isolated from stress due to assembly 82. In such an embodiment, arms 90 can be spread by protrusion in housing 50 such that sensor 98 does not contact arms 90. One aspect of the invention includes supporting sensor 98 between first and second cavities 112, 126 through any appropriate coupling technique or element.

Figure 9:
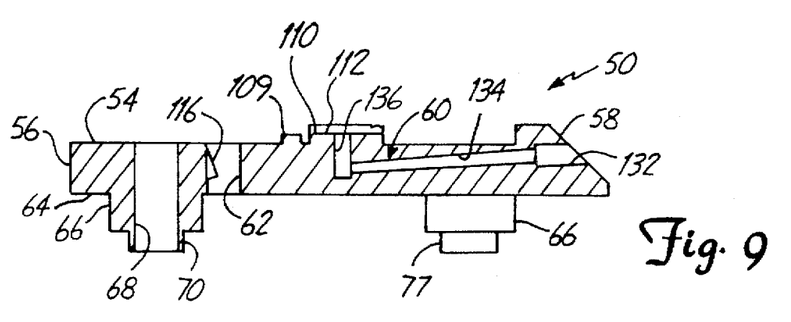
FIG. 9 is a cross-sectional view of the first housing taken along line 9—9 shown in FIG. 10.
Figure 10:
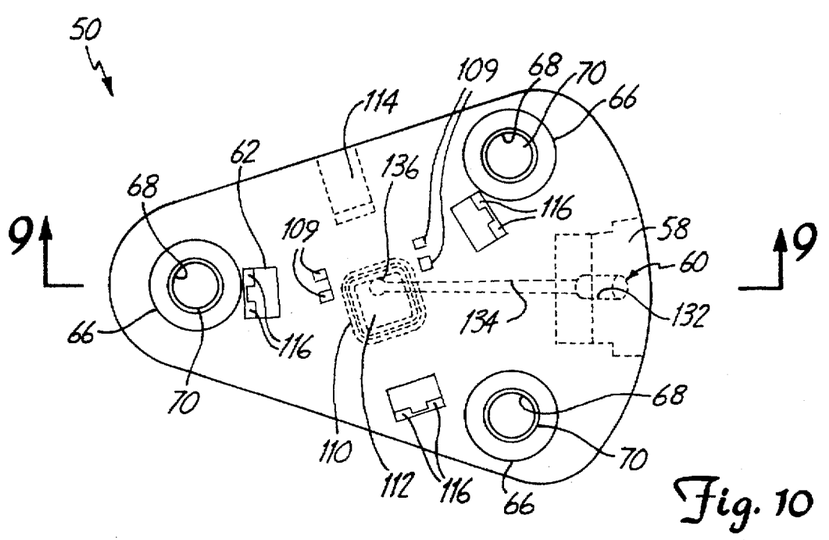
FIG. 10 is a bottom plan view of the first housing.

FIGS. 9 and 10 are side cross-sectional and top plan views, respectively, and show first housing passageway 60 in greater detail. First housing passageway 60 includes process coupling portion 132, tapered portion 134, and sensor coupling portion 136. Process coupling portion 132 extends downwardly from angled process coupling surface 58, and has a fixed diameter. Tapered portion 134 is axially aligned with process coupling portion 132, and extends therefrom with a tapering diameter smaller than that of process coupling portion 132. Sensor coupling portion 136 extends downwardly from first cavity 112, and couples with tapered portion 134.

Figure 11:
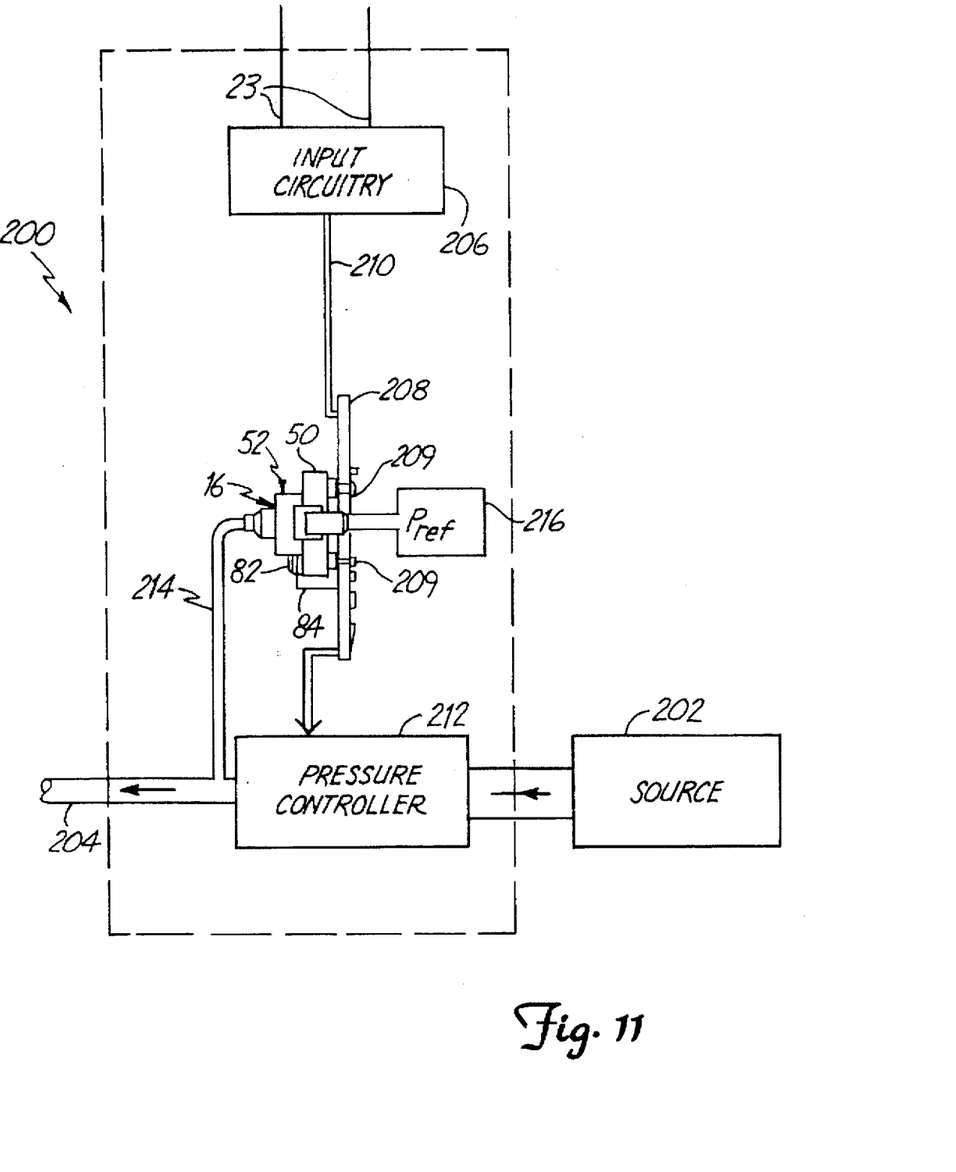
FIG. 11 shows the sensor assembly used in a controller.

FIG. 11 is a diagram of a field device 200 which is shown as an I/P actuator employing pressure sensor assembly 16 in accordance with the invention. Device 200 couples to source 202 which provides pressurized air and provides control output 204 which is controlled pressure used, for example, to control a valve actuator (not shown). Device 200 couples to two-wire process control loop 23 through input circuitry 206 which is connected to control circuit board 208 through bus 210. Assembly 16 is mounted on board 208 by screws 209. Board 208 couples to pressure controller 212 which responsively provides control output 204. Assembly 16 couples to control output 204 through pressure coupling 214 and to a reference pressure source 216 which—may comprise, for example, a vacuum reference for absolute pressure measurement or to atmospheric pressure for gauge pressure measurement. Note that if a vacuum reference is used, it may be included in sensor 98. Sensor 98 in assembly 16 provides a pressure related output on conductors 84 which is used as a feedback signal in controlling the pressure of control output 204 by control circuit board 208. In operation, device 200 receives a command from loop 23 representative of a desired valve position and device 200 responsively controls the control output 204. Note that device 200 is shown in simplified form and may include other types of feedback such as valve position.

Figure 12:
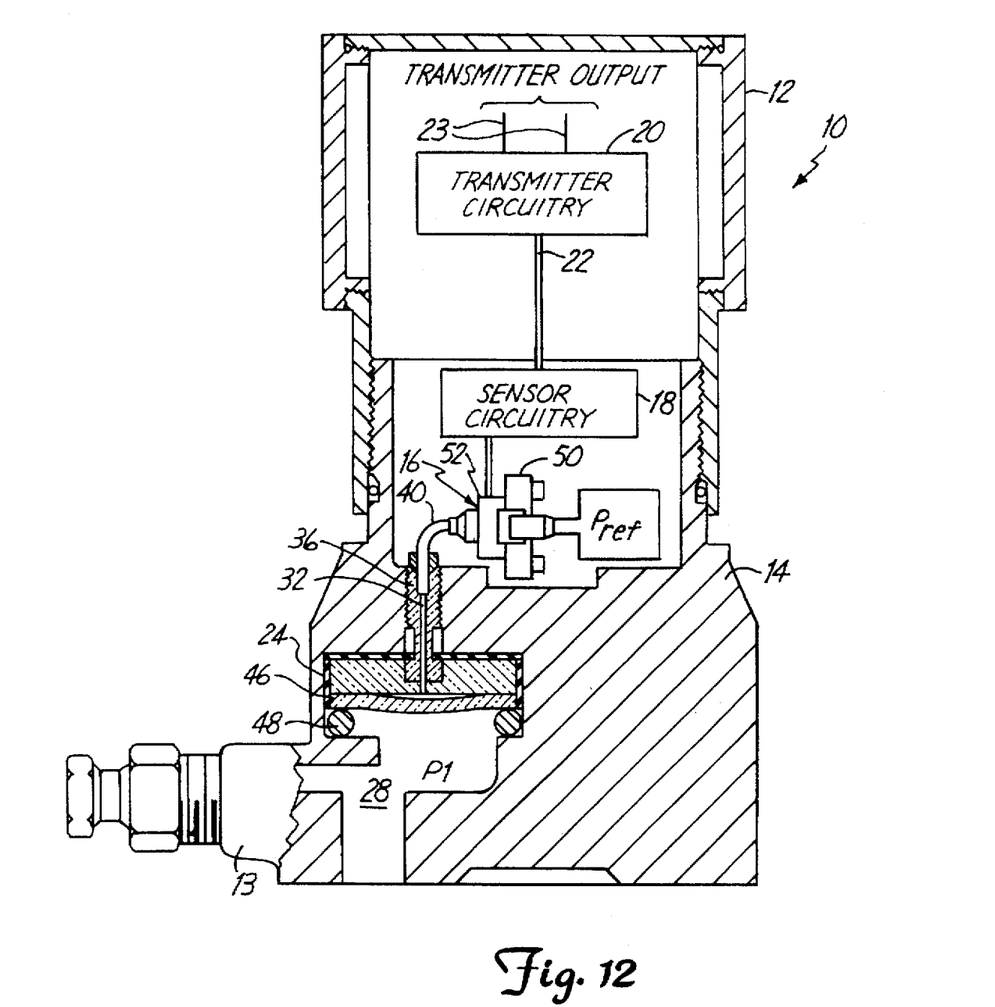
FIG. 12 is a cross-sectional fragmentary view of a pressure transmitter using the sensor assembly of the present invention.

FIG. 12 shows a field device in the form of pressure transmitter 10 having transmitter body 12, flange 13 and lower body 14. Lower body 14 includes pressure sensor assembly 16, and transmitter body 12 includes transmitter circuitry 20. Sensor circuitry 18 is coupled to transmitter circuitry 20 through communication bus 22. Transmitter circuitry 20 sends information related to pressure of process fluid over a two wire communication circuit 23 which comprises, for example, a process control loop.

Pressure sensor assembly 16 receives pressures P1 and $P_{REF}$ and measures a difference in pressure between pressure P1 in passageway 28 and reference pressure $P_{REF}$. Selecting reference pressure $P_{REF}$ equal to atmospheric pressure causes sensor 98 to measure the difference in pressure between P1 and atmospheric pressure, thereby indicating gauge pressure of P1. Alternatively, selecting reference pressure $P_{REF}$ equal to a vacuum causes sensor 98 to measure the difference in pressure between P1 and a vacuum, thereby indicating absolute pressure of P1. Reference pressure $P_{REF}$ is coupled to first housing portion 50 of sensor assembly 16. Pressure P1 is coupled to second housing portion 52 of sensor assembly 16 through passageway 32 via isolator assembly 24. Passageway 32 extends through coupling 36 and tube 40. Passageway 32 is filled with a relatively incompressible isolation fluid such as oil. Coupling 36 is threaded into lower body 14 and provides a long flame-quenching path between the interior of lower body 14 carrying sensor circuitry 18 and process fluid contained in passageway 28. Isolator assembly 24 includes isolation diaphragm 46. Passageway 32 extends to diaphragm 46. A seal ring 48 lies between diaphragm 46 and flange 13.

In operation, transmitter circuitry 20 is coupled to a two-wire communication circuit 23, which in addition to providing a communication channel, energizes transmitter 10. Preferably, circuit 23 is a two-wire process control loop of the type used in industrial process control. Sensor 98 may comprise a solid-state piezo resistive pressure sensor forming a Wheatstone bridge which varies its bridge null as a result of deformation caused by pressure acting on its surface. Pressure P1 urges sensor 98 to deform in one direction while reference pressure $P_{REF}$ urges deformation in the opposite direction. As a result, sensor 98 produces an analog electrical signal related to either gauge pressure, or absolute pressure of P1 when reference pressure $P_{REF}$ is atmospheric pressure or a vacuum, respectively. Sensor circuitry 18 converts the analog signal into digital form. Transmitter circuitry 20 receives the signal from sensor circuitry 18 through communication bus 22 and linearizes, and normalizes the digital signal. Transmitter circuitry 20 transmits the signal over the two-wire circuit 23 by, for example, varying current between 4 and 20 mA through loop 23, or superimposing a digital signal thereon.

Figure 13:
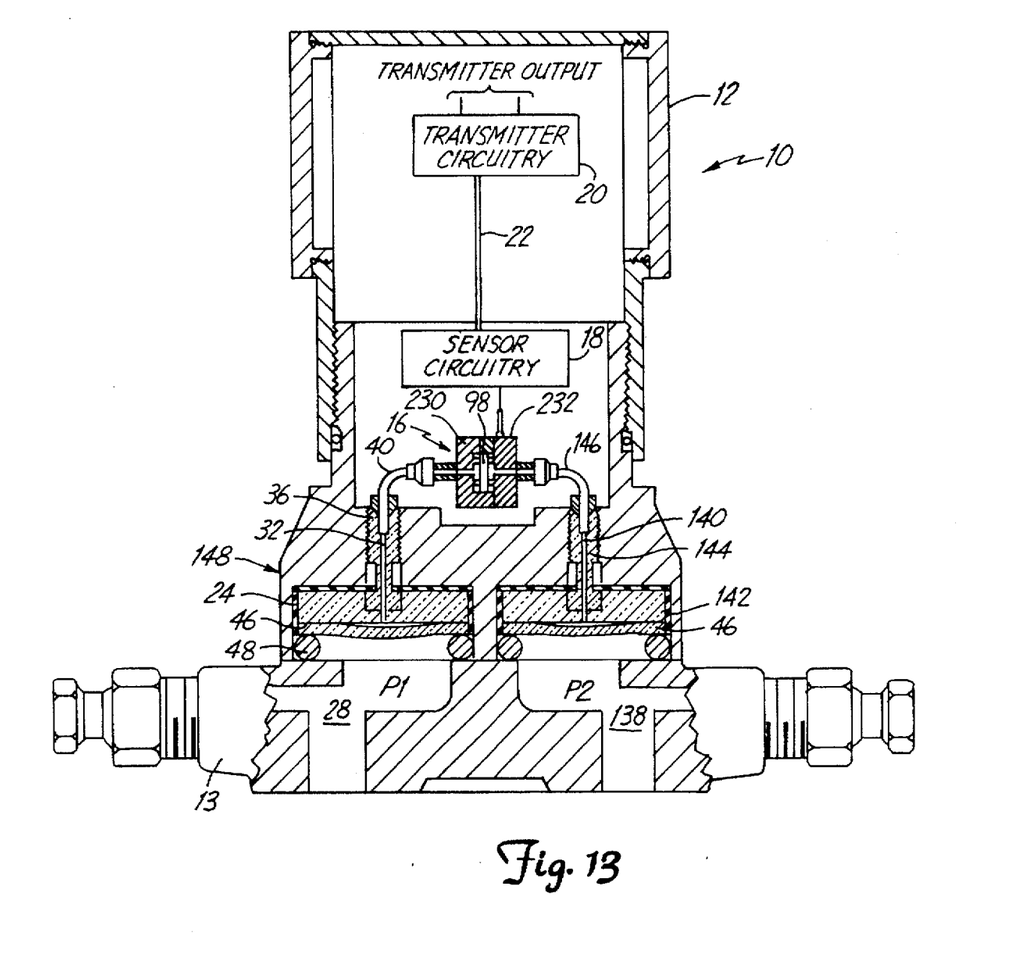
FIG. 13 is a cross-sectional view of a transmitter in accordance with another embodiment.

FIG. 13 is a cross-sectional fragmentary view of pressure transmitter 10 in accordance with another embodiment used to measure a differential pressure. Note that assembly 16 includes first and second housings 230 and 232 which are of a somewhat different design. The housings may be of any shape or design for a particular application. Pressure sensor assembly 16 receives a second pressure P2, and sensor 98 measures a difference in pressure between pressure P1 and passageway 28 and pressure P2 and passageway 138 of flange 13. Pressure P1 is coupled to sensor assembly 16 through passageway 40 and housing 230. Pressure P2 is coupled to first housing portion 232 of sensor assembly 16 through passageway 140 via isolator assembly 142. Passageway 140 extends through coupling 144 and tube 146. Passageway 140 is filled with a relatively incompressible fluid such as oil. Coupling 144 is threaded into lower body 143 and provides a long flame-quenching path between the interior of the lower body carrying sensor circuitry 18 and process fluid contained in passageway 138. Isolator assembly 142 includes isolation diaphragm 46. Passageway 140 extends to diaphragm 46. A seal ring 48 lies between diaphragm 46 and flange 13.

Other embodiments can be used to sense a wide array of process variables. For example, sensor 98 can be a pH, fluid conductivity, humidity, heat capacity, flow rate, temperature sensor. By either changing the orientation of sensor 98, or modifying sensor 98 to include through holes, fluid is able to pass from one housing passageway to the other such that a flow of fluid may be provided through housing 16. Sensor 98 may be any type of sensor such as capacitive, strain, etc. Diaphragms 46 and isolation fluid may be absent in the embodiments of FIGS. 12 and 13, thus providing a continuous passageway for process fluid.

Figure 14:
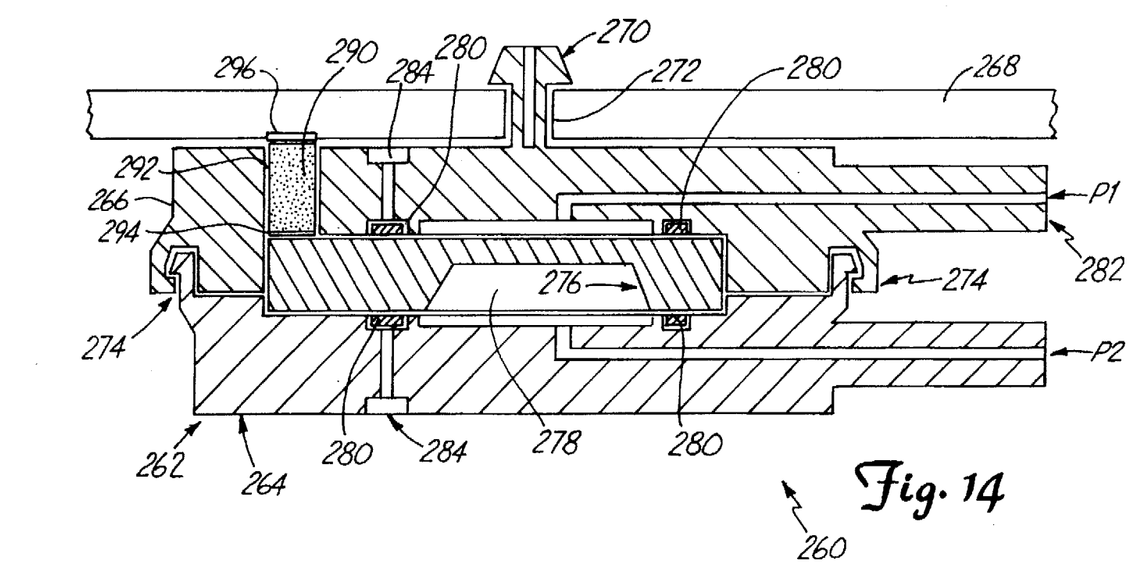
FIG. 14 is a side cross-sectional view of a sensor assembly in accordance with another embodiment.

FIG. 14 is a side cross-sectional view of a sensor assembly 260 in accordance with another embodiment of the invention. Assembly 260 includes housing 262 having first portion 264 and second portion 266 which mounts to circuit board 268 (or other support member) at peg 270 received through opening 272. Portions 264 and 266 are held together by coupling 274 and sensor 276 is thereby secured in cavity 278. Sensor 276 is supported by O-rings 280 and receives pressures P1 and P2 through passageways 282. One aspect of the invention includes injecting elastomeric material through injection openings 284 to thereby form O-rings 280 following assembly of portions 264, 266. The use of injected or FIP (formed in place) O-rings reduces the number of parts required for manufacture and ensures that the O-rings provide a tight seal with sensor 276. In such a design, it may be desirable to allow shrinkage or deflection of portions 264, 266 to accommodate and conform to injected O-rings. As shown in FIG. 14, one aspect of the invention includes suspending and positioning the sensor within the housing without a separate sensor carrier.

FIG. 14 shows another aspect of the invention which includes using an elastomeric conductor 290 which is received through conductor opening 292. Elastomeric conductor 290 provides an electrical conductor between contact pads 294 on sensor 276 and contact pads 296 on circuit board 268. Elastomeric conductor 290 may be placed in opening 292 following assembly of housing 262. Pressure due to mounting sensor assembly 260 to board 268 presses conductor 290 against pads 294 and 296. Such a technique is advantageous for a number of reasons which include ease of assembly, reduced errors or human mistakes during assembly and potentially improved long term reliability. Further, the elastomeric material may tend to self seal around the contact pads thereby preventing entry of water or other contaminants. The elastomeric conductor material may be inserted into opening 292 after assembly, or could be mounted or friction fit in opening 292. Such elastomeric conductors include Zebra™ available from Fujipoly Inc., 750 Walnut Avenue, Cranford, N.J. 07016, Shin-Flexk and Shin-Flexk NE-Connector from ShinEtsu, 34135 Seventh Street, Union City, Calif. 94587 and Isocon from Rogers Corporation, One Technology Drive, Rogers, Conn. 06263.

As can be seen, the present invention offers many advantages. By using a simple snap-together design, the parts can be injection molded and snapped together, keeping manufacturing costs low. Further, the device does not rely on organic coatings or gels to protect the sensor element or electrical connections. Instead, inorganic materials may be employed which are more impervious to water or other fluids. By subjecting the sensor directly to the process fluid, performance is significantly increased. If a thick sensor is used, the needs for a backing wafer or force balancing on compressed surfaces are obviated, thus reducing the parts count, cost of assembly, and increasing reliability. Furthermore, by using precise alignment, the seals substantially oppose one another, thus minimizing stress on the sensor during assembly and reducing the likelihood of sensor fracture. The present invention protects the sensor conductors from both the process fluid and the isolation fluid thereby minimizing any potential risk of conductor degradation.

Although the present invention has been described with reference to preferred embodiments, workers skilled in the art will recognize that changes may be made in form and detail without departing from the spirit and scope of the invention. For example, for high temperature operation, both housing portions could be constructed from metal with compliant portions and the seals could be constructed from glass frit or other appropriate materials. As used herein, fluid or process fluid is intended to include gases, liquids, and their mixture. Further, field device includes any device used in a process control system such as a controller, transmitters, etc. In one embodiment, the seals are printed directly onto the sensor providing a printed elastomeric seal thereby reducing assembly cost and improving reliability. However, as used herein "sealing member" shall mean any element or technique known to those skilled in the art which may be used to seal to the sensor.

What is claimed is:

1. An apparatus used to measure a fluid parameter of a fluid, comprising:

a first fluid coupling having a first coupling passageway formed therethrough for carrying the fluid;

a sensor assembly having a first housing portion and a second housing portion forming a sensor cavity between respective first and second housing portion cavities, the sensor assembly including a housing passageway formed through one of the first housing portion and second housing portion for operably coupling the sensor cavity to the fluid coupling;

a sensor in the sensor cavity having a sensor electrical contact isolated from the fluid providing a sensor output related to the fluid parameter and suspended between the first and second housing portion cavities; and a sensor carrier positioning the sensor in the sensor cavity and having an electrical conductor which couples to the sensor electrical contact and extends from the sensor cavity, the sensor carrier releasably coupled to the sensor.

2. The apparatus of claim 1 wherein the first housing portion and second housing portion are adapted to fit together.

3. The apparatus of claim 1 wherein the first housing portion and second housing portion have registration features that cooperate to register the sensor within the sensor cavity.

4. The apparatus of claim 1 wherein the sensor comprises a solid-state sensor.

5. The apparatus of claim 1 wherein the sensor comprises a pressure sensor.

6. The apparatus of claim 1 including a second fluid coupling having a second coupling passageway for carrying fluid and the sensor assembly includes a second housing passageway extending through the other of the first housing portion and second housing portion, the second housing passageway coupling the second coupling passageway to the sensor cavity.

7. The apparatus of claim 6 wherein the passageways are adapted to provide a flow of fluid through the sensor cavity.

8. The apparatus of claim 1 wherein the sensor measures a parameter selected from the group consisting of pH, temperature, flow rate, humidity, fluid electrical conductivity, heat capacity, fluid thermal conductivity, and fluid optical characteristics.

9. The apparatus of claim 6 wherein the sensor comprises a differential pressure sensor.

10. The apparatus of claim 1 wherein:

the first housing portion includes a sensor coupling face, and a first rim disposed on the sensor coupling face forming a first cavity therein which communicates with the housing passageway;

the second housing portion includes an interior face, and a second rim disposed on the interior face forming a second cavity therein which communicates with a second passageway; and the sensor includes a first face, a second face opposed to the first face, and a sensing element therebetween, a first seal disposed on the first face about the sensing element coupled to the first rim couples the sensor to the housing passageway, and a second seal disposed on the second face about the sensing element coupled to the second rim couples the sensor to the second passageway.

11. The apparatus of claim 10 wherein the first and second seals comprise printed elastomeric material.

12. The apparatus of claim 1 wherein the sensor is mounted with substantially zero insertion force.

13. The apparatus of claim 1 wherein the sensor carrier includes two elongated arms adapted to receive the sensor therebetween.

14. The apparatus of claim 13 wherein the two arms include registration protrusions to thereby secure the sensor carrier in the sensor cavity between the first and second housing portions.

15. The apparatus of claim 1 including:

input circuitry for coupling to a process control loop;

a pressure input for coupling to a source of pressurized gas;

a pressure controller coupling to the pressure input and providing a control output adapted for controlling a valve in response to a control input, wherein the fluid coupling couples to the control output; and a control circuit electrically coupled to the sensor electrical contact providing the control input to the pressure controller to thereby control the control output based upon an input received by the input circuitry from the process control loop and a pressure feedback signal provided by the sensor.

16. The apparatus of claim 1 wherein the fluid coupling is adapted for coupling to process fluid and further including:

transmitter circuitry coupled to the sensor electrical contact and a two-wire process control loop receiving the sensor output and responsively transmitting a transmitter signal related to the sensed fluid parameter over the two-wire process control loop.

17. The apparatus of claim 1 wherein the first and second housings include snap fit mounts which couple the first housing to the second housing.

18. The apparatus of claim 1 including an elastomeric conductor which forms an electrical contact with the sensor electrical contact and extends through an opening in the housing.

19. The apparatus of claim 18 including an external electrical contact mounted to the housing and wherein the elastomeric conductor provides an electrical contact between an external electrical contact and the sensor electrical contact.

20. The apparatus of claim 19 including a circuit board carrying the external electrical contact.

21. The apparatus of claim 1 including an opening formed in the housing for injecting a seal into the cavity which seals the sensor to the housing.

* * * * *

UNITED STATES PATENT AND TRADEMARK OFFICE
CERTIFICATE OF CORRECTION

PATENT NO. : 5,763,787
DATED : June 9, 1998
INVENTOR(S) : James L. Gravel et al.

It is certified that error appears in the above-indentified patent and that said Letters Patent is hereby corrected as shown below:

Title page item [73] Assignee:

Change "Rosemont Inc." to --Rosemount Inc.--.

Signed and Sealed this

Second Day of February, 1999

Attest:

Attesting Officer

*Acting Commissioner of Patents and Trademarks*